(12) United States Patent
Lee et al.

(10) Patent No.: US 10,447,121 B2
(45) Date of Patent: Oct. 15, 2019

(54) FUEL PUMP FOR VEHICLE HAVING BRUSH HOLDER FOR PREVENTING SHAKE OF BRUSH

(71) Applicant: COAVIS, Sejong-si (KR)

(72) Inventors: Hyun Tae Lee, Sejong-si (KR); Gyu Sang Yu, Chungcheongbuk-do (KR); In Seok Sohn, Chungcheongbuk-do (KR)

(73) Assignee: COAVIS, Sejong-si (KR)

( * ) Notice: Subject to any disclaimer, the term of this patent is extended or adjusted under 35 U.S.C. 154(b) by 382 days.

(21) Appl. No.: 15/299,232

(22) Filed: Oct. 20, 2016

(65) Prior Publication Data
US 2017/0117772 A1 Apr. 27, 2017

(30) Foreign Application Priority Data
Oct. 23, 2015 (KR) .................. 10-2015-0147693

(51) Int. Cl.
*H02K 13/10* (2006.01)
*H02K 5/14* (2006.01)
*H02K 5/12* (2006.01)
*F02M 51/04* (2006.01)

(52) U.S. Cl.
CPC .......... *H02K 13/10* (2013.01); *H02K 5/148* (2013.01); *F02M 51/04* (2013.01); *H02K 5/12* (2013.01)

(58) Field of Classification Search
CPC ........ H02K 13/10; H02K 13/105; H02K 5/14; H02K 5/148; H02K 5/12; H02K 9/28; H01R 39/38; H01R 39/40; H01R 39/41
See application file for complete search history.

(56) References Cited

U.S. PATENT DOCUMENTS 5,961,293 A * 10/1999 Clemmons ............. F02M 37/10
417/410.4

FOREIGN PATENT DOCUMENTS

| EP | 1584812 A1 * | 10/2005 | ............. F02M 37/08 |
| JP | 03043654 A * | 2/1991 | |
| JP | 2008079388 A | 4/2008 | |
| JP | 5261486 B2 | 8/2013 | |
| KR | 20000059723 A | 10/2000 | |

OTHER PUBLICATIONS

English translation of JP 03-043654 A, accessed Feb. 1, 2019, <https://www4.j-platpat.inpit.go.jp/cgi-bin/tran_web_cgi_ejje?u= http://www4.j-platpat.inpit.go.jp/eng/translation/201902012319587 303409351832118299A4F4287A3E0CED3182DC66688908 592B> (Year: 1991).*

* cited by examiner

*Primary Examiner* — Jeremy A Luks
(74) *Attorney, Agent, or Firm* — McCoy Russell LLP

(57) ABSTRACT

The present invention relates to a fuel pump for vehicle supplying power to a commutator and an armature through a brush to prevent the brush from shake, which comprises the brush, a spring mounted on a top of the brush, the commutator contacted to a bottom of the brush, a brush holder surrounding the brush and the spring, and a first hole formed for fuel flow at a front side of the brush holder in a rotational direction of the commutator based on the brush.

3 Claims, 3 Drawing Sheets

FUEL PUMP FOR VEHICLE HAVING BRUSH HOLDER FOR PREVENTING SHAKE OF BRUSH

CROSS-REFERENCE TO RELATED APPLICATIONS

This application claims priority under 35 U.S.C. 119 to Korean Patent Application No. 10-2015-0147693, filed on Oct. 23, 2015 in the Korean Intellectual Property Office, the disclosure of the above-cited application is incorporated herein by reference in its entirety for all purposes.

TECHNICAL FIELD

The present invention relates to a fuel pump having brush holder for preventing shake of brush when a commutator rotates, especially a fuel pump having brush holder with a hole for fuel flow in one side to prevent shaking of brush.

BACKGROUND

FIG. 1 is a cross-sectional view of a fuel pump. As described in FIG. 1, when starting engine of a vehicle, generally its fuel pump supplies power to an armature 10 through a carbon brush 100 and a commutator 300. As the armature 10 of the fuel pump is driven, an impeller connected to the armature 10 rotates to discharge fuel from a fuel tank, and thereby the fuel discharged through the fuel pump is supplied to the engine in constant pressure.

At this moment, the carbon brush 100 and the commutator 300 are contacted to each other, so that the carbon brush 100 moves in a rotational direction of the commutator 300. However since the carbon brush 100 adhered to an inside wall of a brush holder 400 contacts the rotating commutator 300, if the carbon brush 100 is shaken, the carbon brush 100 and the commutator 300 may be temporarily detached. Then, rotational force of fuel pump and discharge performance may be reduced, and the engine may be stopped during driving.

According to JP 5261486 ("Electric pump device", May 2, 2013, hereinafter referred to as prior art), to prevent shake of brush, an inside wall of a brush holder is inclined for a brush to be more easily adhered to the inside wall whenever a commutator rotates. However, the prior art does not disclose a fundamental method to prevent shake of brush.

PRIOR DOCUMENTS

Patent Documents

JP 5261486 ("Electric pump device", May 2, 2013)

SUMMARY

The present invention is configured to solve the problem mentioned above, and an object of the present invention is to provide a fuel pump for a vehicle having a brush holder with a hole formed for fuel flow in one side of the brush holder in order to minimize and to prevent shake of a brush when a commutator rotates.

To attain this goal, a fuel pump of the present invention comprises a brush 100, a spring 200 mounted on a top of the brush 100, a commutator 300 contacted to a bottom of the brush 100, a brush holder 400 surrounding the brush 100 and the spring 200, and a first hole 410 formed for fuel flow at a front side (A) of the brush holder 400 in a rotational direction of the commutator 300 based on the brush 100.

Also, it is characterized in that the first hole 410 is formed for fuel flow at an upper portion of the front side (A) of the brush holder 400.

Also, it is characterized in that the first hole 410 is extended to a bottom of the brush holder 400 and the bottom of the first hole 410 is open.

Also, it is characterized in that the brush holder 400 further includes a second hole 420 for fuel flow at a lower portion of a back side (A') of the brush holder 400 in the rotational direction of the commutator 300 based on the brush 100.

By forming a first hole for fuel flow in one side of the brush holder and making the brush adhered to brush holder through fuel injected to an inside of the brush holder in a direction opposite to a rotational direction of a commutator, the present invention has an advantageous effect to minimize and prevent shake of a brush.

DETAILED DESCRIPTION OF EMBODIMENTS

Figure 1:
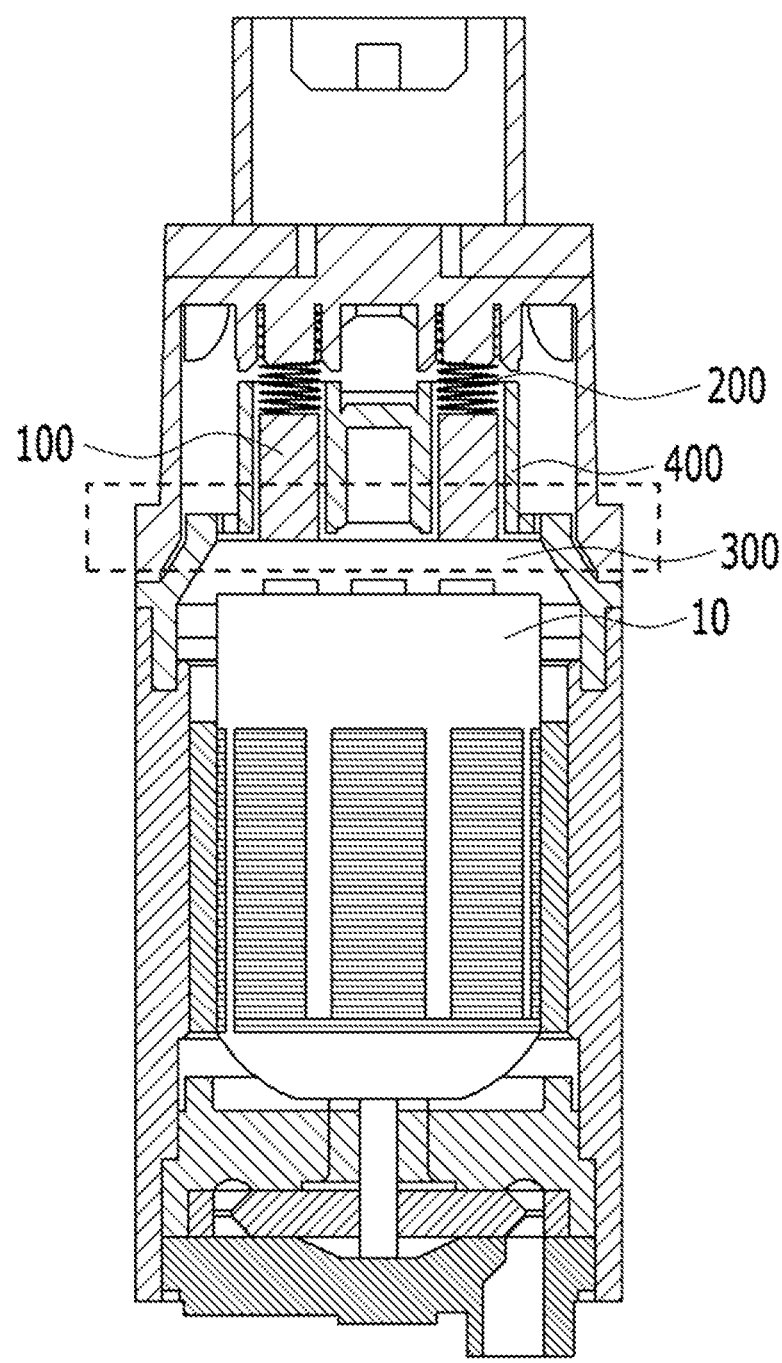
FIG. 1 is a cross-sectional view of a fuel pump.

Now the fuel pump of the present invention will be explained in detail with the accompanying drawings. The accompanying drawings are exemplary ones for explaining the technical characteristics of the present invention. Therefore, the technical scope of the present invention is not limited to the drawings accompanied.

The present invention relates to a fuel pump for vehicle having a brush holder to prevent shake of brush when the pump is driven. FIG. 3 is a cross sectional view of A-A' in FIG. 2 and shows a first embodiment of a brush holder for preventing shake of a brush according to the present invention. As described in FIG. 1, the fuel pump comprises a brush 100, a spring 200, a commutator 300 and a brush holder 400 designed to prevent shake of brush 100. The spring 200 is mounted on a top of the brush 100 and commutator 300 is located beneath of the brush 100 with the bottom of the brush 100 contacting with the top of the commutator 300.

The brush holder 400 surrounds the brush 100 and the spring 200, and its bottom is opened. Also, the brush holder 400 comprises a first hole 410. The first hole 410 is a path for fuel injected to an inside of the brush holder 400. More specifically, the brush holder 400 comprises the first hole 410 formed at an upper portion of a front side (A) of the brush holder 400 in a rotational direction of the commutator 300 based on the brush 100. The first hole 410 is a path for fuel injected to the inside of the brush holder 400 (where the brush 100 is positioned) in a direction opposite to the rotational direction of the commutator 300.

Figure 2:
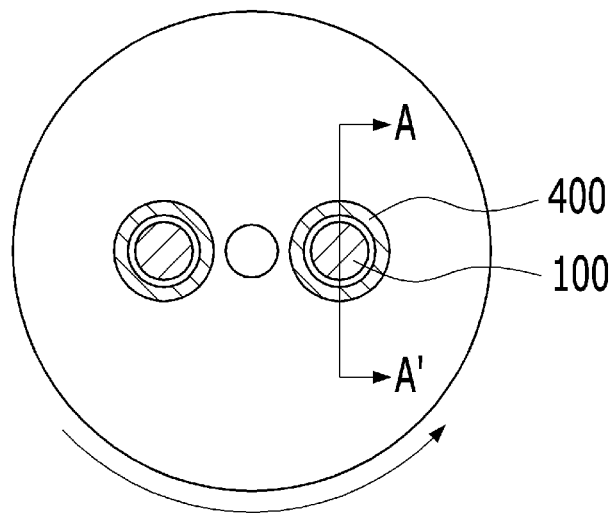
FIG. 2 is a schematic top view of dashed area in FIG. 1 showing operation of the fuel pump.
Figure 3:
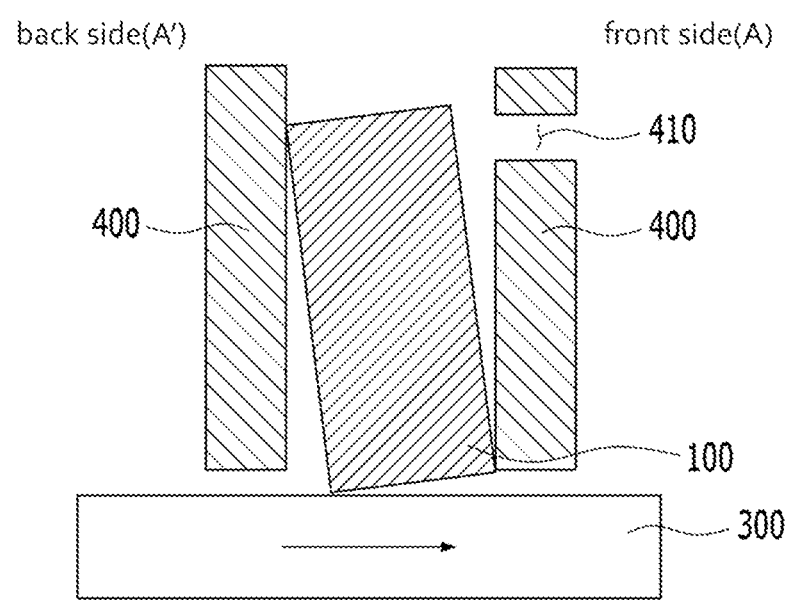
FIG. 3 is a first embodiment of a brush holder according to the present invention.

FIG. 2 is a schematic top view of dashed area in FIG. 1 and shows operation of the fuel pump. As described in FIG. 2 and FIG. 3, when the commutator 300 rotates, the bottom of the brush 100 contacted to the commutator 300 also moves in the rotational direction of the commutator 300 by friction. At this time, if fuel in high pressure is injected to the inside of the brush holder 400 through the first hole 410, the top of the brush 100 moves in a direction opposite to the rotational direction of the commutator 300 due to the injected fuel through the first hole 410. At this moment, the direction of force toward the top and the bottom of the brush holder 400 is opposite, and if the constant force is provided, the brush 100 may be fixed in a tilted position and minimize its shake.

Figure 4:
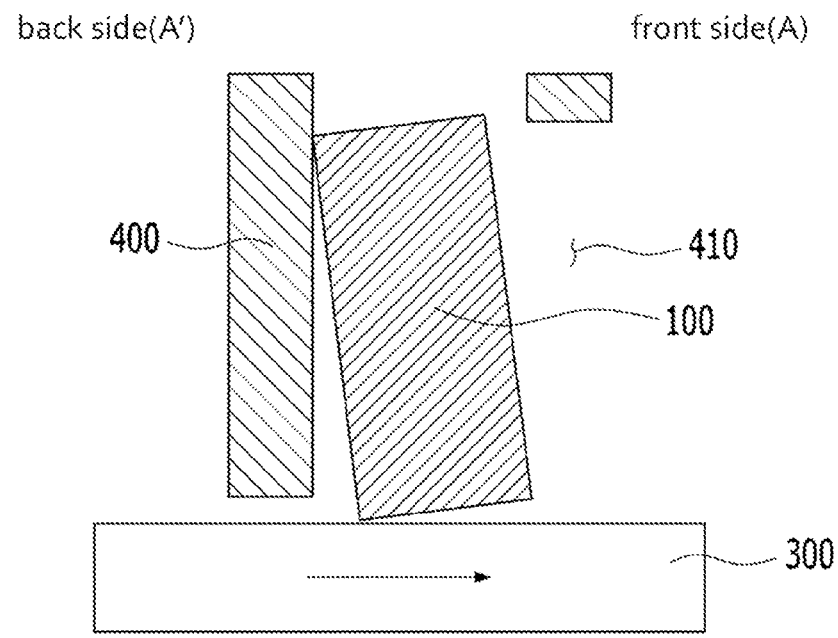
FIG. 4 is a second embodiment of the brush holder according to the present invention.

FIG. 4 is a cross sectional view of A-A' in FIG. 2 and shows a second embodiment of the brush holder for preventing shake of the brush according to the present invention. As described in FIG. 4, the brush holder 400 of the second embodiment comprises the first hole 410 extended from the upper portion to the bottom of the brush holder which is open.

This configuration increases inflow of fuel through the first hole 410, so that the top of the brush 10 is moved in a direction opposite to the rotational direction of the commutator 300. That is, when rotational force of the commutator 300 is high, more fuel may be injected through the first hole 410. Therefore, the brush 100 inclined may be less shaken by moving the top of the brush 100 in a direction opposite to the rotational direction of the commutator 300.

Figure 5:
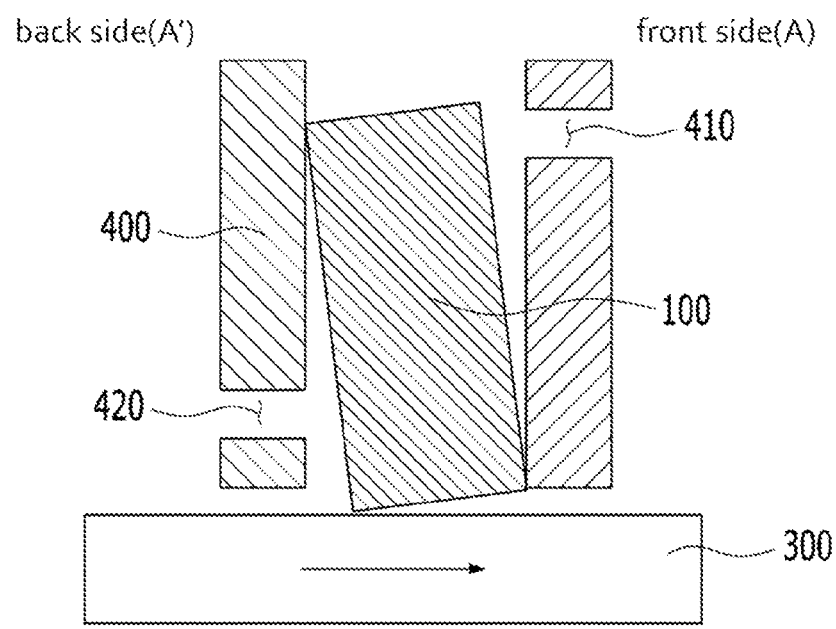
FIG. 5 is a third embodiment of the brush holder according to the present invention.

FIG. 5 is a cross sectional view of A-A' in FIG. 2 and shows a third embodiment of the brush holder for preventing shake of the brush according to the present invention. As described in FIG. 5, the brush holder 400 of the third embodiment of present invention further comprises a second hole 420.

The second hole 420 is formed at a lower portion of a back side (A') of the brush holder 400 in the rotational direction of the commutator 300. More specifically, the first hole 410 is, based on the brush 100, formed at the upper portion of the front side (A) of the brush holder 400 in the rotational direction of the commutator 300 and the second hole 420 is, based on the brush 100, formed at the lower portion of the back side (A') of the brush holder 400 in the rotational direction of the commutator 300.

At this time, the top and the bottom of the brush 100 moves in opposite directions respectively by fuel injected through the first hole 410 and the second hole 420, and since the top and the bottom of the brush 100 is adhered to the inside of the brush holder 400 through continuous inflow of the fuel, shake of the brush 100 may be minimized.

Diameter of the first hole 410 and the second hole 420 should be shorter than that of the brush 100 to avoid that the brush 100 is caught in or comes out through the first hole 410 and the second hole 420.

The present invention is not limited to the embodiments mentioned above but it may be widely applied to technical fields in various forms within its purpose.

DETAILED DESCRIPTION OF MAIN ELEMENT

100: Brush
200: Spring
300: Commutator
400: Brush holder
410: First hole
420: Second hole

What is claimed is:

1. A brush holder provided in a fuel pump for a vehicle to prevent shaking of a brush, the fuel pump comprising:
   the brush;
   a spring mounted on a top of the brush; and
   a commutator, a top of which is in contact with a bottom of the brush, to supply power to the commutator and an armature through the brush;
   wherein the brush holder is formed to surround the brush and the spring, and a lower portion of the brush holder is opened so that the brush and the commutator are in contact with each other;
   wherein the brush holder comprises a first hole formed for fuel ingress at a front side of the brush holder in a rotational direction of the commutator based on the brush; and
   wherein the first hole is formed at a position corresponding to an upper portion of the brush that is in a tilted state when the commutator rotates and thereby a lower portion of the brush moves toward the front side of the brush holder, such that the upper portion of the brush is adhered to a back side of the brush holder through fuel introduced in a direction opposite to the rotational direction of the commutator, thereby preventing the brush from shaking.

2. The brush holder according to claim 1, wherein the first hole is extended to a bottom of the brush holder and a bottom of the first hole is open.

3. The brush holder according to claim 1, wherein the brush holder further includes a second hole for fuel flow at a lower portion of the back side of the brush holder in the rotational direction of the commutator based on the brush.

* * * * *